(12) United States Patent
Sato et al.

(10) Patent No.: US 8,106,522 B2
(45) Date of Patent: Jan. 31, 2012

(54) ADHESIVE SHEET FOR A STEALTH DICING AND A PRODUCTION METHOD OF A SEMICONDUCTOR WAFER DEVICE

(75) Inventors: Yosuke Sato, Saitama (JP); Masatomo Nakamura, Gunma (JP)

(73) Assignee: LINTEC Corporation, Tokyo (JP)

( * ) Notice: Subject to any disclaimer, the term of this patent is extended or adjusted under 35 U.S.C. 154(b) by 0 days.

(21) Appl. No.: 12/958,446

(22) Filed: Dec. 2, 2010

(65) Prior Publication Data

US 2011/0136322 A1    Jun. 9, 2011

(30) Foreign Application Priority Data

Dec. 4, 2009    (JP) .................. 2009-276906

(51) Int. Cl.
*H01L 29/40*    (2006.01)
*B32B 7/12*    (2006.01)

(52) U.S. Cl. ................. 257/783; 438/113; 428/355 R
(58) Field of Classification Search .............. 438/113; 257/783, E21.599; 428/355 R
See application file for complete search history.

(56) References Cited

U.S. PATENT DOCUMENTS

| 7,108,911 B2 * | 9/2006 | Abe et al. ............... 428/355 R |
| 7,875,500 B2 * | 1/2011 | Inada et al. ............... 438/113 |
| 2010/0112315 A1 * | 5/2010 | Song et al. ............... 428/200 |

* cited by examiner

*Primary Examiner* — William D Coleman
*(74) Attorney, Agent, or Firm* — Cahn & Samuels, LLP

(57) ABSTRACT

An adhesive sheet is provided enabling to efficiently produce the very small size semiconductor chip by a stealth dicing method. An adhesive sheet for a stealth dicing includes a substrate and an adhesive layer formed on one side of the substrate, wherein a Young's modulus of the adhesive sheet at 23° C. is 200 to 600 MPa, and a storage elastic modulus of the adhesive layer at 23° C. is 0.10 to 50 MPa.

9 Claims, 2 Drawing Sheets

ADHESIVE SHEET FOR A STEALTH DICING AND A PRODUCTION METHOD OF A SEMICONDUCTOR WAFER DEVICE

This application claims priority of Japanese patent document 2009-276906 filed on Dec. 4, 2009 in Japan, the entirety of which is incorporated herein by reference.

BACKGROUND OF THE INVENTION

1. Field of the Invention

The present invention relates to a step of focusing a laser beam to the inside of the semiconductor wafer and an adhesive sheet used for a step of separating a semiconductor wafer by expanding the adhesive sheet. Also, the present invention relates to a production method of the semiconductor wafer device using said adhesive sheet.

2. Description of the Related Art

After a circuit is formed on a surface of the semiconductor wafer, a backside grinding step which grinds the backside of the wafer and control the thickness of the wafer is performed, and a dicing step which separates the wafer into a predetermined chip size is performed.

Recently, along with the wide spread of the IC card, the semiconductor chip which is the constituting member of the IC card, has become thinner. Thus, although the thickness was conventionally 350 μm or so, the semiconductor wafer is demanded to be as thin as 50 to 100 μm or even less.

As the wafer is a brittle member, the risk of being broken during the transportation or so increases as it gets thinner. When such ultra thin wafer is cut by a dicing blade which rotates in a high speed, the chipping or so are produced particularly on the backside of the semiconductor wafer; and significantly lowers the transverse strength of the chip.

Thus, so called a stealth dicing method is proposed (Patent document 1) which irradiates the laser beam to the inside of the semiconductor wafer; thereby forming a dicing line while selectively forming the modified portion, then cuts the semiconductor wafer by using the modified portion as the starting point. According to the stealth dicing method, after forming the modified portion by irradiating the laser beam to the inside of the semiconductor wafer, the ultra thin semiconductor wafer is adhered to the adhesive sheet comprising the substrate and the adhesive layer, then by expanding the adhesive sheet, the semiconductor wafer is divided along the dicing line (dicing), thereby the semiconductor chip can be produced efficiently.

However, in such stealth dicing method, the adhesive sheet (the dicing sheet) used for the conventional dicing step was used when producing a semiconductor chip having a very small size. When this is used, the stress (the expanding force) during the expanding of the adhesive sheet is adsorbed by the adhesive sheet, thus the expanding force cannot sufficiently transferred to the modified portion inside the wafer. Hence it was difficult for the wafer to efficiently form the chip. When the expanding force is not sufficiently transferred, each chip is not divided at the dicing line, which causes to connect plurality of the chips and has a risk to lower the production efficiency of the semiconductor chip. Also, even in case the substrate side of the adhesive sheet is scratched by the jigs or so simultaneously as the expanding, it was still difficult to efficiently produce the small chips.

[Patent Document 1] Japanese Patent No. 3762409

SUMMARY OF THE INVENTION

The present invention aims to solve the problems accompanying the conventional technology as described in the above. That is, the present invention aims to provide an adhesive sheet enabling to efficiently produce the very small size semiconductor chip by a stealth dicing method. Also, the present invention aims to provide the production method of a semiconductor wafer device using said adhesive sheet.

The summary of the present invention aiming to solve such problems is as follows.

(1) An adhesive sheet for a stealth dicing comprising a substrate and a adhesive layer formed on one side of the substrate, wherein a Young's modulus of the adhesive sheet at 23° C. is 200 to 600 MPa, and a storage elastic modulus of the adhesive layer at 23° C. is 0.10 to 50 MPa.

(2) The adhesive sheet for the stealth dicing as set forth in (1), wherein a breaking elongation of the adhesive sheet when stretched at 200 mm/min is 50% or more.

(3) The adhesive sheet for the stealth dicing as set forth in (1) or (2), wherein the adhesive layer is an adhesive agent composition including an acrylic copolymer, and the thickness of the adhesive layer is 1 to 15 μm.

(4) The adhesive sheet for the stealth dicing as set forth in any one of (1) to (3), wherein the substrate comprises vinyl chloride film and a thickness of the substrate is 40 to 90 μm.

(5) A production method of a semiconductor device comprising, a step of forming a modified portion inside a wafer by irradiating a laser beam to the semiconductor wafer formed with a circuit on a surface, a step of adhering the adhesive sheet for the stealth dicing as set forth in any one of (1) to (4) to a backside of the semiconductor wafer, a step of forming chips by dividing the semiconductor wafer by expanding the adhesive sheet, and a step of picking up the semiconductor chips.

Effect of the Invention

According to the adhesive sheet for the stealth dicing of the present invention, the stress (the expanding force) when expanding the adhesive sheet can be sufficiently transferred to the modified portion formed at the inside of the wafer; hence the semiconductor chip having a very small size can be produced efficiently.

DETAILED DESCRIPTION OF INVENTION

Figure 1:
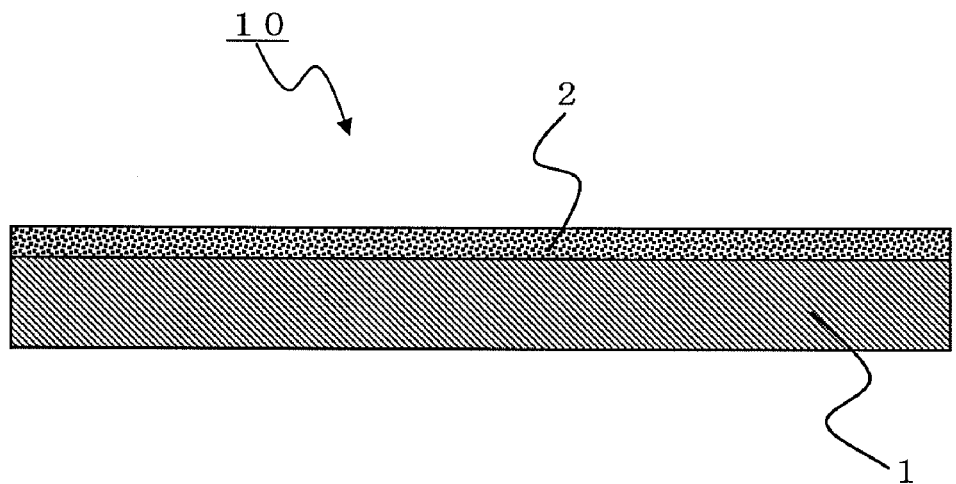
FIG. 1 shows the cross sectional view of the adhesive sheet for the stealth dicing according to the present invention.

Hereinafter, the adhesive sheet for the stealth dicing according to the present invention will be described in detail by referring to the figures. As shown in FIG. 1, the adhesive sheet 10 for the stealth dicing according to the present invention comprises a substrate 1 and a adhesive layer 2 foamed on one side thereof.

The Young's modulus of the adhesive sheet 10 for the stealth dicing at 23° C. is 200 to 600 MPa, preferably 250 to 500 MPa, and more preferably 300 to 400 MPa.

Also, the storage elastic modulus of the adhesive layer 2 at 23° C. is 0.10 to 50 MPa, preferably 0.20 to 40 MPa, and more preferably 1.0 to 30 MPa.

The laser beam is irradiated by adjusting the focal point to the inside of the semiconductor wafer 11, and the modified portion is formed in the wafer along the imaginary cutting line 18 which divides between the circuits. Next, the semiconductor wafer 11 is adhered to the adhesive layer 2 of the adhesive sheet 10 for the stealth dicing. Then, the adhesive sheet 10 is expanded to form chips from the semiconductor wafer 11 (the dicing). By having the physical properties of the adhesive sheet 10 and the adhesive layer 2 within the range described in above, it allows to stretch the adhesive sheet 10 uniformly during the expanding step, and also the semiconductor wafer 11 or the semiconductor chip 12 adhered to the adhesive layer 2 does not fall off. Furthermore, since the stress when expanding the adhesive sheet 10 is sufficiently transferred to the modified portion inside the wafer, the chips can be formed efficiently from the semiconductor wafer 11.

The braking elongation of the adhesive sheet 10 when stretched at 200 mm/min is preferably 50% or more, more preferably 70% or more and particularly preferably 100% or more.

By having the braking elongation of the adhesive sheet 10 within the above range; the adhesive sheet 10 is unlikely to rupture during the expanding and each chips can be easily separated.

Note that, in case of forming the adhesive layer 2 of the adhesive sheet 10 by an energy-ray curable adhesive agent described in the following, the Young's modulus of the adhesive sheet, the elasticity of the adhesive layer and the braking elongation of the adhesive sheet may change. The expanding step is usually performed before the energy-ray irradiation; however it may be performed after the energy-ray irradiation. Therefore, the Young's modulus of the adhesive sheet, the elasticity of the adhesive layer, the braking elongation of the adhesive sheet defined in the present invention are usually physical value before the energy-ray irradiation; however the adhesive sheet which satisfies the above physical value after the irradiation of the energy-ray is also included within the scope of the present invention. Also, it is preferable that the above physical values are satisfied particularly during the expanding step.

Such adhesive sheet 10 for the stealth dicing is obtained for example by forming the adhesive layer 2 on one side of the substrate 1, as shown in FIG. 1. As for the substrate 1, for example, polyethylene film such as high density polyethylene (HPDE) film, stretched or non-stretched polypropylene film, polybutene film, polybutadiene film, polymethylpentene film, poly vinyl chloride film, vinyl chloride copolymer film, polyurethane film, ethylene vinyl acetate copolymer film, and the films comprising hydride or modification thereof may be used. Also, the cross-linking film and copolymer film thereof can be used; however considering the expanding property, poly vinyl chloride film is preferable. The above substrate may comprise only one type, or it may be a composite film combining two types or more.

Also, as described in the following, in case the adhesive layer 2 is formed by an ultra-violet ray curable adhesive agent; and the ultra-violet ray is used as the energy-ray which is irradiated for curing the adhesive agent; then the substrate is preferably transparent against the ultra-violet ray. Note that, in case the electron beam is used as the energy-ray, then it is not necessary to be transparent. Besides the above mentioned films, a transparent film by coloring those, and non-transparent film or so may be used as well.

Also, on the top surface of the substrate 1, that is on the side of the surface of the substrate where the adhesive layer 2 is provided with a corona treatment or a primer layer in order to improve the adhesiveness of with the adhesive agent. Also, various coating membrane may be coated on the opposite surface of the adhesive layer 2. The adhesive sheet 10 is produced by providing the adhesive layer on the substrate described in the above. The thickness of the substrate 1 is preferably within the range of 40 to 90 μm, further preferably 50 to 80 μm. By using such substrate 1, the expanding force can be transferred further sufficiently to the modified portion inside the wafer.

The adhesive layer 2 may be formed by various conventionally known adhesive agents. As for such adhesive agent it is not particularly limited; however for example the adhesive agent of a rubber type, an acrylic type, a silicone type or polyvinyl ether or so may be used. Also, the adhesive agent of an energy-ray curable type, a heat foaming type, or a water swelling type or so may be used as well. As for the energy-ray curable (an ultra-violet curable, an electron beam curable or so) adhesive agent, particularly the ultra-violet ray curable adhesive agent is preferably used.

In case of forming the adhesive layer 2 by the energy-ray curable adhesive agent, the adhesive layer is formed by using the adhesive agent composition combining an energy-ray curable adhesive component and, a photo polymerization initiator if needed. Further, in order to improve various physical properties, the above mentioned adhesive agent composition may include other components (a cross linker or so) depending on the needs. As for the cross linker, an organic polyvalent isocyanate compound, an organic polyvalent epoxy compound, and an organic polyvalent imine compound or so may be mentioned. Hereinafter, the energy-ray curable adhesive component will be described in detail taking the acrylic adhesive agent as an example.

The energy-ray curable adhesive component comprises an acrylic polymer (A) in order to provide sufficient adhesiveness and a sheet forming property (a sheet processing property) to the adhesive agent composition, and also comprises an energy-ray curable compound (B). The energy-ray curable compound (B) also includes an energy-ray polymerizable group, and polymerize and cure when the energy-ray such as ultraviolet-ray, electron beam or so is irradiated, thus has a function which allows to lower the adhesive force of the adhesive agent composition. Also, as for those comprising both properties of above mentioned component (A) and (B) (hereinafter it may be referred to as a component (AB)), the energy-ray curable adhesive polymer formed by binding the energy-ray polymerizable group to the main chain or the side chain may be used. Such energy-ray curable adhesive polymer (AB) comprises the properties of the adhesiveness and the energy-ray curable property.

As for the acrylic polymer (A), conventionally known acrylic polymer may be used. The weight average molecular weight (Mw) of the acrylic polymer (A) is preferably 100,000 to 2,000,000, and further preferably 300,000 to 1,500,000. Also the molecular weight distribution (Mw/Mn, Mn is number average molecular weight) is preferably 1.0 to 10, further preferably 1.0 to 3.0. Further, the glass-transition temperature (Tg) of the acrylic polymer (A) is preferably −70 to 30° C., and further preferably −60 to 20° C.

As for the monomer constituting the above mentioned acrylic polymer (A), (meth)acrylate monomer or the derivative thereof may be mentioned. For example, alkyl(meth)acrylates in which the alkyl groups having 1 to 18 carbon atoms, such as methyl(meth)acrylate, ethyl (meth)acrylate, propyl(meth)acrylate, butyl(meth)acrylate, 2-ethylhexyl (meth)acrylate or so may be mentioned; (meth)acrylate having cyclic structure, such as cycloalkyl(meth)acrylate, benzyl (meth)acrylate, isobornyl acrylate, dicyclopentanyl acrylate, dicyclopentenyl acrylate, dicyclopentenyloxyethyl acrylate, imide acrylate or so may be mentioned; 2-hydroxyethyl (meth)acrylate, 2-hydroxypropyl(meth)acrylate or so comprising hydroxyl groups may be mentioned; acrylic acid, methacrylic acid, itaconic acid, glycidyl methacrylate, glycidyl acrylate or so may be mentioned. Also, the above mentioned acrylic polymer (A) is preferably the acrylic copolymer which has copolymerized vinyl acetate, and acrylonitrile, styrene or so.

The energy-ray curable compound (B) is a compound which polymerize and cures when irradiated by the energy-ray such as ultra-violet ray or electron beam or so. As for the example of this energy-ray curable compound, a low molecular weight compound having the energy-ray polymerizable group (a monomer and an oligomer of monofunctional and polyfunctional) may be mentioned. Specifically, a acrylate such as trimethylolpropane triacrylate, tetramethylol methane tetraacrylate, pentaerythritol triacrylate, dipentaerythritol monohydroxy pentaacrylate, dipentaerythritol hexaacrylate, 1,4-butyleneglycol diacrylate, and 1,6-hexanediol diacrylate; a cyclic aliphatic structure containing acrylate such as dicyclopentadiene dimethoxy diacrylate, and isobornyl acrylate or so may be mentioned; and acrylic compound such as polyethylene glycol diacrylate, oligoester acrylate, urethane acrylate oligomer, epoxy modified acrylate, polyether acrylate, itaconic acid oligomer or so may be used. Such compounds comprises at least one polymerizable double bond in the molecule, and usually the molecular weight is 100 to 30000, preferably 300 to 10000 or so.

Generally, with respect to 100 parts by weight of the component (A), 10 to 400 parts by weight, preferably 30 to 350 parts by weight or so of the component (B) is used.

The energy-ray curable adhesive polymer (AB) having both properties of the above mentioned component (A) and (B) is formed by binding the energy-ray polymerizable group on the main chain or the side chain.

The main structure of the energy-ray curable adhesive polymer is not particularly limited, and it may be the acrylic copolymer widely used as the adhesive agent. Also, it may be either an ester type or an ether type, however in any case, the acrylic copolymer is preferably the main structure because it is easy to control the synthesis and the adhesiveness.

The energy-ray polymerizable group binding to the main chain or the side chain of the energy-ray curable adhesive polymer is for example, a group including the carbon-carbon double bond having energy-ray polymerizable property, and specifically (meth)acryloyl group may be mentioned as an example. The energy-ray polymerizable group may be bonded to the energy-ray curable adhesive polymer via alkylene group, alkyleneoxy group, and polyalkyleneoxy group.

The weight average molecular weight (Mw) of the energy-ray curable adhesive polymer (AB) to which the energy-ray polymerizable group is bonded is preferably 100,000 to 2,000,000 and more preferably 300,000 to 1,500,000. The molecular weight distribution (Mw/Mn, Mn is the number average molecular weight) is preferable 1.0 to 10, and more preferably 1.0 to 3.0. Also, the glass-transition temperature (Tg) of the energy-ray curable adhesive polymer (AB) is preferably −70 to 30° C., and further preferably −60 to 20° C.

The energy-ray curable adhesive polymer (AB) is obtained by reacting for example, the acrylic adhesive polymer containing the functional group such as hydroxyl group, carboxyl group, amino group, substituted amino group and epoxy group or so, and the polymerizable group containing compound comprising the substituent group which reacts with said functional group and 1 to 5 of the energy-ray polymerizable carbon-carbon double bond, in each molecule. The acrylic adhesive polymer is preferably a copolymer formed by, (meth)acrylic ester monomer having the functional group such as hydroxyl group, carboxyl group, amino group, substituted amino group and epoxy group or so and the derivative thereof and the monomer constituting said component (A). Also, as for the polymerizable group containing compound, (meth)acryloyloxyethyl isocyanate, meta-isopropenyl-α, α-dimethylbenzyl isocyanate, (meth)acryloyl isocyanate, allyl isocynate, glycidyl(meth)acrylate and (meth)acrylic acid or so may be mentioned.

The energy-ray curable adhesive component including the above mentioned acrylic polymer (A) and the energy-ray curable compound (B) or the energy-ray curable adhesive polymer (AB) cures by the energy-ray irradiation. As for the energy-ray, specifically the ultra-violet ray and the electron beam or so may be mentioned.

As for the photopolymerization initiator, a photoinitiator such as a benzoin compound, an acetophenone compound, an acylphosphine oxide compound, a titanocene compound, a thioxanthone compound, a peroxide compound or so may be mentioned, and a photosensitizer such as amine and quinone or so may be mentioned. Specifically, 1-hydroxycyclohexyl phenyl ketone, benzoin, benzoin methyl ether, benzoin ethyl ether, benzoin isopropyl ether, benzyl diphenyl sulfide, tetramethylthiuram monosulfide, azobisisobutyronitrile, dibenzyl, diacetyl, β-chloranthraquinone and 2,4,6-trimethylbenzoyl diphenylphosphine oxide or so may be mentioned as examples. In case of using the ultra-violet ray as the energy-ray, the irradiation time and the irradiation amount can be less by incorporating the photopolymerization initiator.

The thickness of the adhesive layer 2 is preferably 1 to 15 μm, further preferably 2 to 10 μm, and particularly preferably 3 to 8 μm.

Also, a release sheet may be stacked to the adhesive layer 2 in order to protect the adhesive layer prior to the use thereof. The release sheet is not particularly limited, and for example, films made from a resin such as polyethylene terephthalate, polypropylene, and polyethylene or so, or a foaming film thereof; or papers such as a glassine paper, a coat paper, and a laminated paper or so which has been release treated by a silicone, fluorine and long chain alkyl group containing carbamate or so may be used.

The method for providing the adhesive layer 2 on the surface of the substrate 1 may be carried out by transferring the adhesive layer, which is formed by coating on the release sheet so that it becomes the predetermined thickness, on to the substrate 1; or the adhesive layer 2 may be formed by directly coating on the surface of the substrate 1.

Figure 2:
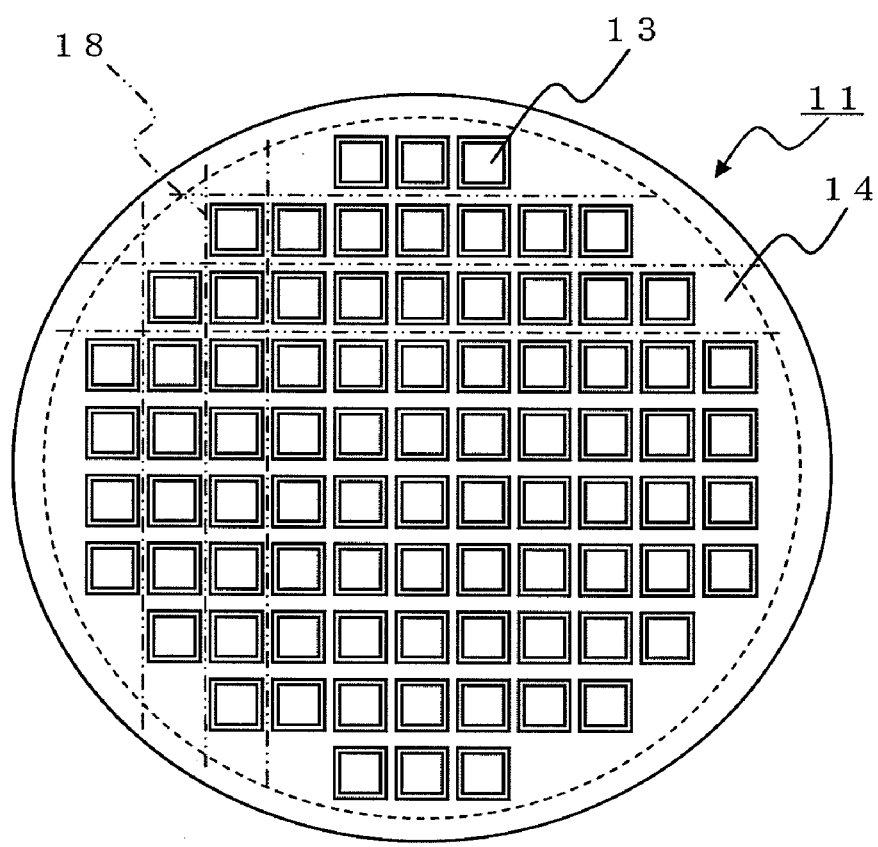
FIG. 2 shows the plane view of the circuit forming face of the semiconductor wafer.

Next, the adhesive sheet 10 according to the present invention used for the production method of a semiconductor device will be described. In connection with the production method of the semiconductor device according to the present invention will be described using the case of forming the chips from the semiconductor wafer 11 formed with the circuit 13 on the front surface as the example. FIG. 2 shows the plane view of the circuit surface side of the semiconductor wafer 11 formed with the circuit 13 on the front surface. Note that, the imaginary cutting line 18 is an imaginary line which divides between each circuit 13.

The semiconductor wafer 11 may be silicon wafers or it may be a compound semiconductor wafer such as gallium/arsenide or so. The circuit 13 is formed on the wafer surface by various method including the conventionally widely used methods such as an etching method, and a lift-off method or so. During the circuit forming step of the semiconductor wafer, the predetermined circuit 13 is formed. The circuit 13 is formed in a grid like shape on an inner peripheral portion 14 of the wafer 11. The thickness of the wafer 11 before the grinding is not particularly limited; however, it is usually 500 to 1000 μm or so.

During the backside grinding, the adhesive sheet called surface protection sheet is adhered on the circuit surface in order to protect the circuit 13 on the surface. The backside grinding is carried out by fixing the circuit surface side of the wafer 11 (that is the surface protection sheet side) using the suction table; then grinding the backside which is not formed with the circuit 13 is carried out using the grinder. As a result, although the thickness of the semiconductor wafer after the grinding is not particularly limited, it usually becomes 50 to 200 μm or so. After the backside grinding step, a step for removing the fractured layer produced by the grinding of the wafer backside may be performed.

Followed by the backside grinding step, if needed a processing treatment involving a heat generation such as the etching treatment to the backside, or a treatment carried out in high temperature such as a vapor deposition of a metal membrane to the backside or baking the organic membrane may be performed. Note that, in case of carrying out the treatment at high temperature usually the treatment to the backside is carried out after the surface protection sheet is released.

After the backside grinding, the laser beam is irradiated to the inside of the wafer 11 from the backside of the wafer 11. The laser beam is irradiated from the laser beam source. The laser beam source is a device which generates a light having a uniform wavelength and phase, and as for the type of the laser beam, those which causes a multiphoton absorbance such as Nd-YAG laser, Nd-YVO laser, Nd-YLF laser, and Ti:sapphire laser or so which generates pulse laser beam may be mentioned. The wavelength of laser beam is preferably 800 to 1100 nm and more preferably 1064 nm.

The laser beam is irradiated to the inside of the wafer 11, and the modified portion is formed at the inside of the wafer along the imaginary cutting line 18. The number of the laser scanning through one imaginary cutting line may be once or it may be plurality of times. Preferably, the irradiation point of the laser beam and the position of the imaginary cutting line 18 between the circuits is monitored, and the laser beam is irradiated while positioning the laser beam.

Figure 3:
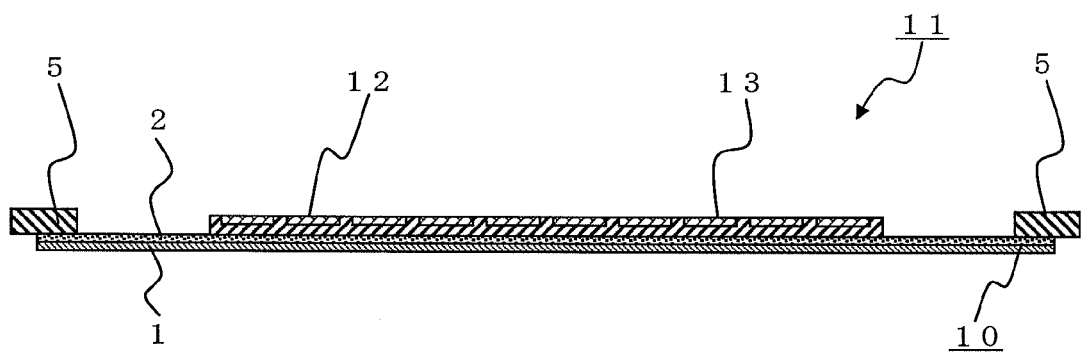
FIG. 3 shows a step of the production method of the semiconductor device according to the present invention.

As shown in FIG. 3, after the modified portion is formed, the adhesive layer 2 of the adhesive sheet 10 for the stealth dicing according to the present invention is adhered to the backside of the wafer 11, and the dicing of the wafer 11 is carried out. Note that, when the surface protection sheet is adhered to the wafer surface, the surface protection sheet is released before or after the adhesive sheet 10 is adhered. The adhesive sheet 10 is adhered to the wafer backside generally by the device called a mounter; however it is not particularly limited.

After forming the modified portion at the inside of the wafer by the laser beam irradiation, the adhesive sheet 10 is stretched when the expanding is carried out, and the semiconductor wafer 11 is cut and separated into individual chip 12 using the modified portion inside the wafer as the starting point. Also, the wafer 11 may be cut and separated into individual chip 12 by stretching the adhesive sheet 10 by scratching the adhesive sheet 10 from the substrate 1 side using the jigs or so simultaneously with the expanding. The expanding is preferably performed at the speed of 5 to 600 mm/min. Then, the chip 12 is picked up via the bonding step and the semiconductor wafer device is produced. Note that, when the adhesive layer 2 is formed by the energy-ray curable adhesive agent, it is preferable to irradiate the energy-ray before the pick up step.

Hereinbefore, the example of the use of the adhesive sheet 10 for the stealth dicing according to the present invention was described. However, the adhesive sheet 10 for the stealth dicing according to the present invention can be used for dicing various products such as an usual semiconductor wafer, a glass substrate, a ceramic substrate and an organic material substrate such as FPC or so; or metal material such as a precision component or so.

EXAMPLES

Hereinafter the present invention will be explained using examples; however the present invention is not to be limited thereto.

<The Stealth Dicing Condition>

The laser beam was irradiated to the inside of the silicon wafer from the backside of the following silicon wafer under the condition described in the following. Next, the adhesive sheet of the example or the comparative example was adhered to the silicon wafer backside, and fixed to the ring frame. Then, the adhesive sheet was expanded to form the chip from the silicon wafer. Note that, the chip size was 2 mm×2 mm, 0.5 mm×0.5 mm, and 0.15 mm×0.15 mm. Also, when using the adhesive layer of the energy-ray curable type for the adhesive layer of the adhesive sheet, the adhesive sheet was expanded before the energy-ray irradiation.

Device: Nd-YAG laser
Wavelength: 1064 nm
Repeating frequency: 100 kHz
Pulse width: 30 nm
Cut speed: 100 mm/sec
Wafer material: Silicon
Wafer thickness: 100 μm
Wafer size: 50 mm×50 mm (square)
Adhesive sheet size: about 207 mm diameter <The Young's Modulus and Braking Elongation of the Adhesive Sheet>

The Young's modulus and the braking elongation of the adhesive sheet was measured using an universal tensile tester (TENSILON/RTA-T-2M manufactured by ORIENTEC Co., LTD.) in accordance with JIS K7161:1994, under the condition of 23° C., the humidity 50%, and at the tensile speed of 200 mm/min. Note that, when using the adhesive layer of the energy-ray curable type for the adhesive layer of the adhesive sheet, the Young's modulus and the braking elongation of the adhesive sheet was measured before the energy-ray irradiation.

<The Storage Elastic Modulus (G') of the Adhesive Layer>

In the example and the comparative example, the adhesive layer being sandwiched between two polyethylene terephthalate films (the release films) which have been silicone release treated was obtained. One of the release films was released and repeatedly stacked so that the adhesive layers laminate; thereby the adhesive layer having 3 mm thickness was obtained. A cylindrical column having 8 mm diameter was punched out, thereby the samples for measuring the elastic modulus was obtained. The release film of the both sides were released, then the storage elastic modulus (G') at the frequency of 1 Hz by the twist shear method of this sample and at the temperature of 23° C., was measured using a viscoelasticity measuring apparatus (DYNAMIC ANALYZER RDA-II manufactured by RHEOMETRIC Co., LTD.). Note that, when using the adhesive layer of the energy-ray curable type for the adhesive layer of the adhesive sheet, the storage elastic modulus (G') of the adhesive sheet was measured before the energy-ray irradiation.

<The Thickness of the Substrate and the Adhesive Layer>

The thickness of the substrate and the adhesive layer was measured using a fixed pressure thickness measuring instrument (PG-02, manufactured by TECLOCK Corporation).

<The Expanding Property of the Adhesive Sheet>

The adhesive sheet of the examples and the comparative examples were adhered to the ring frame for the 8 inch wafer, and then expanded (10 mm pull down) at the speed of 300 mm/min using the expanding device (DDS2010, manufactured by DISCO Corporation). When the expanding was carried out without any problem, then it was defined as "good", and when the adhesive sheet fell off from the ring frame or when the adhesive sheet was teared, then it was defined as "bad". Note that, when using the adhesive layer of the energy-ray curable type for the adhesive layer of the adhesive sheet, the expanding property of the adhesive sheet was evaluated before the energy-ray irradiation.

<The Chip Dividing Ratio>

The modified portion inside the silicon wafer was formed under the above described stealth dicing condition, then after the wafer and the ring frame 5 for the 8 inch wafer were adhered to the adhesive sheet of the examples and comparative examples, the adhesive sheet was expanded using the expanding device (DDS2010, manufactured by DISCO Corporation) to form the chips from the wafer. Note that, the chips were made from the wafer after expanded (300 mm/min, 10 mm pull down) for the chips having chip size of 2 mm×2 mm, and the chips were made from the wafer by expanding (300 mm/min, 5 mm pull down) and at the same time of scratching the adhesive sheet from the substrate side using the jigs for the chips having chip size of 0.5 mm×0.5 mm and chip size of 0.15 mm×0.15 mm. The number of chips having the intended chip size (the number of chips separated completely) was counted visually, then the chip dividing ratio was calculated from the ratio of the number of the chips having the intended chips size to the expected entire number of the chips on the wafer (the total number of the expected chips). When the chip dividing ratio was 99.5% or higher it was defined "very good", when it was 98% or higher then it was defined "good" and when it was less than 98% it was defined "bad". Also, when the adhesive layer of the energy-ray curable type was used for the adhesive agent of the adhesive sheet, the adhesive sheet was expanded before the energy-ray irradiation.

Example 1

With respect to 100 parts by weight of acrylic copolymer (2-ethylhexyl acrylate/vinyl acetate/acrylic acid/methyl methacrylate/2-hydroxyethyl methacrylate)=18.5/75/1/5/0.5 (weight ratio), Mw=600,000, Mw/Mn=8.2, Tg=5° C.), 60 parts by weight of bifunctional urethane acrylate oligomer (Mw=8000), and 60 parts by weight of hexafunctional urethane acrylate oligomer (Mw=2000) were blended to make the energy-ray curable adhesive component; and 3 parts by weight of the photo polymerization initiator ("IRGACURE 184", manufactured by Ciba Specialty Chemicals), and 3 parts by weight of polyvalent isocyanate compound (CORONATE L, manufactured by Nippon Polyurethane Industry Co., Ltd.) were blended (all the blending ratio is in terms of the solid portion) to the energy-ray curable adhesive component; thereby the adhesive agent Composition was made.

After coating the above mentioned adhesive agent composition to the release film, it was dried to produce the adhesive layer having thickness of 10 μm. Next, by using poly vinyl chloride film (the Young's modulus=350 MPa) having the thickness of 80 μm as the substrate, the adhesive layer was transferred; and obtained the adhesive sheet for the stealth dicing. "The Young's modulus and braking elongation of the adhesive sheet" and "the storage elastic modulus (G') of the adhesive layer" were measured, and "the expanding property of the adhesive sheet" and "the chip dividing ratio" were evaluated. The results are shown in Table 1.

Example 2

Except for making the thickness of the adhesive layer to 5 μm, the adhesive sheet for the stealth dicing was obtained as same as the example 1; and the measuring and the evaluation were carried out. The results are shown in Table 1.

Example 3

Except for using the cast polypropylene film (the Young's modulus=550 MPa) having the thickness of 80 μm as the substrate, the adhesive sheet for the stealth dicing was obtained as same as the example 1; and the measuring and the evaluation were carried out. The results are shown in Table 1.

Example 4

With respect to 100 parts by weight of the acrylic adhesive polymer (butyl acrylate/methyl methacrylate/2-hydroxy ethyl acrylate=62/10/28 (weight ratio)), 30 parts by weight of methacryloyloxyethyl isocyanate as the polymerizable group containing compound was reacted to obtain the energy-ray curable adhesive polymer (Mw=550,000, Mw/Mn=6.2, Tg=−30° C.); and 2.5 parts by weight of the photo polymerization initiator ("IRGACURE 184", manufactured by Ciba Specialty Chemicals) and 1.1 parts by weight of polyvalent isocyanate compound (CORONATE L, manufactured by Nippon Polyurethane Industry Co., Ltd.) were blended to the energy-ray curable adhesive component (all the blending ratio is in terms of the solid portion), thereby the adhesive agent composition was made. Except for using the above adhesive agent composition, the adhesive sheet for the stealth dicing was obtained as same as the example 1, and the measuring and the evaluation were carried out. The results are shown in Table 1.

Example 5

Except for making the thickness of the adhesive layer to 5 μm, the adhesive sheet for the stealth dicing was obtained as same as the example 4; and the measuring and the evaluation were carried out. The results are shown in Table 1.

Example 6

With respect to 100 parts by weight of the acrylic copolymer (acrylic rubber S-9000, manufacture by TORAY COTEX CO., Ltd, Mw=600,000, Mw/Mn=2.4, Tg=−25° C.), 1.9 parts by weight of polyvalent isocyanate compound (CORONATE L, manufactured by Nippon-Polyurethane Industry Co., Ltd.) were blended (all the blending ratio is in terms solid portion), thereby the adhesive agent composition was made.

Except for making the thickness of the adhesive layer to 5 μm using the above mentioned adhesive agent composition, the adhesive sheet for the stealth dicing was obtained as same as the example 1, and the measuring and the evaluation were carried'out. The results are shown in Table 1.

Example 7

Except for using poly vinyl chloride film (the Young's modulus=350 MPa) having the thickness of 50 μm as the substrate, the adhesive sheet for the stealth dicing was obtained as same as the example 2; and the measuring and the evaluation were carried out. The results are shown in Table 1.

Example 8

Except for making the thickness of the adhesive layer to 15 μm, the adhesive sheet for the stealth dicing was obtained as same as the example 1; and the measuring and the evaluation were carried out. The results are shown in Table 1.

Comparative Example 1

Except for using ethylene/methacrylate acid copolymer film (the Young's modulus=120 MPa) having the thickness of 80 μm as the substrate, the adhesive sheet for the stealth dicing was obtained as same as the example 1; and the measuring and the evaluation were carried out. The results are shown in Table 1.

Comparative Example 2

With respect to 100 parts by weight of acrylic copolymer (butyl acrylate/acrylic acid=91/9 (weight ratio), Mw=800,000, Mw/Mn=10.5, Tg=−38° C.), 124 parts by weight of trifunctional urethane acrylate oligomer (Mw=4000) was blended to make the energy-ray curable adhesive component; and 3 parts by weight of the photo polymerization initiator ("IRGACURE 184", manufactured by Ciba Specialty Chemicals) and 2.2 parts by weight of polyvalent isocyanate compound (CORONATE L, manufactured by Nippon Polyurethane Industry Co., Ltd.) were blended (all the blending ratio is in terms of solid portion) to the energy-ray curable adhesive component thereby the adhesive agent composition was made. Except for using the above adhesive agent composition, the adhesive sheet for the stealth dicing was obtained as same as the example 1, and the measuring and the evaluation were carried out. The results are shown in Table 1.

Comparative Example 3

Except for using poly ethylene terephthalate film (the Young's modulus=4500 MPa) having the thickness of 50 μm as the substrate, the adhesive sheet for the stealth dicing was obtained as same as the example 1; and the measuring and the evaluation were carried out. The results are shown in Table 1.

REFERENCE OF THE NUMERALS

| | |
|---|---|
| 1 | substrate |
| 2 | adhesive agent layer |
| 5 | ring frame |
| 10 | adhesive sheet for stealth dicing |
| 11 | semiconductor wafer |
| 12 | semiconductor chip |
| 13 | circuit |
| 14 | inner peripheral portion |
| 18 | cutting line (imaginary) |

The invention claimed is:

1. An adhesive sheet for a stealth dicing comprising a substrate and an adhesive layer formed on one side of the substrate, wherein a Young's modulus of the adhesive sheet at 23° C. is 200 to 600 MPa, and a storage elastic modulus of the adhesive layer at 23° C. is 0.10 to 50 MPa.

2. The adhesive sheet for the stealth dicing as set forth in claim 1, wherein a breaking elongation of the adhesive sheet when stretched at 200 mm/min is 50% or more.

3. The adhesive sheet for the stealth dicing as set forth in claim 1, wherein the adhesive layer comprises an adhesive agent composition including an acrylic copolymer, and the thickness of the adhesive layer is 1 to 15 μm.

4. The adhesive sheet for the stealth dicing as set forth in claim 1, wherein the substrate is vinyl chloride film and a thickness of the substrate is 40 to 90 μm.

5. A production method of a semiconductor device comprising,
    a step of forming a modified portion inside a wafer by irradiating a laser beam to the semiconductor wafer formed with a circuit on a surface,
    a step of adhering the adhesive sheet for the stealth dicing as set forth in claim 1 to a backside of the semiconductor wafer,
    a step of forming chips by dividing the semiconductor wafer by expanding the adhesive sheet, and
    a step of picking up the semiconductor chips.

6. A production method of a semiconductor device comprising,
    forming a modified portion inside a wafer by irradiating a laser beam to the semiconductor wafer formed with a circuit on a surface;

TABLE 1

| Thickness of the adhesive layer (μm) | The Young's modulus of the adhesive sheet (MPa) | The storrage elastic modulus of the adhesive layer (MPa) | The breaking elongation of the adhesive sheet (%) | The expanding property of the adhesive sheet | The chip dividing ratio | | |
|---|---|---|---|---|---|---|---|
| | | | | | 0.15 × 0.15 mm | 0.5 × 0.5 mm | 2 × 2 mm |
| 10 | 311 | 0.21 | 200 | good | bad | very good | very good |
| 5 | 329 | 0.21 | 180 | good | good | very good | very good |
| 10 | 512 | 0.21 | 455 | good | bad | good | very good |
| 10 | 302 | 0.11 | 190 | good | bad | good | very good |
| 5 | 319 | 0.11 | 170 | good | bad | very good | very good |
| 5 | 345 | 12.00 | 165 | good | very good | very good | very good |
| 5 | 308 | 0.21 | 150 | good | good | very good | very good |
| 15 | 278 | 0.21 | 205 | good | bad | bad | good |
| 10 | 110 | 0.21 | 520 | good | bad | bad | bad |
| 10 | 298 | 0.08 | 175 | good | bad | bad | bad |
| 10 | 3750 | 0.21 | 120 | bad | bad | bad | bad | adhering the adhesive sheet for the stealth dicing as set forth in claim 1 to a backside of the semiconductor wafer;

forming chips by dividing the semiconductor wafer by expanding the adhesive sheet; and picking up the semiconductor chips.

7. A production method according to claim 6, comprising adhering the adhesive sheet for the stealth dicing as set forth in claim 2 to a backside of the semiconductor wafer.

8. A production method according to claim 6, comprising adhering the adhesive sheet for the stealth dicing as set forth in claim 3 to a backside of the semiconductor wafer.

9. A production method according to claim 6, comprising adhering the adhesive sheet for the stealth dicing as set forth in claim 4 to a backside of the semiconductor wafer.

* * * * *